United States Patent
Nishikawa (10) Patent No.: US 8,948,295 B1
(45) Date of Patent: Feb. 3, 2015

(54) PREAMBLE GENERATING DEVICE, PREAMBLE GENERATING METHOD, AND NON-TRANSITORY COMPUTER-READABLE RECORDING MEDIUM STORING A PROGRAM

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 14/311,897

(22) Filed: Jun. 23, 2014

(51) Int. Cl.
*H04L 27/00* (2006.01)
*H04L 27/26* (2006.01)
*H04L 29/06* (2006.01)

(52) U.S. Cl.
CPC ............ *H04L 27/2614* (2013.01); *H04L 69/22* (2013.01)
USPC .......................................................... 375/295

(58) Field of Classification Search
USPC ................. 375/260, 295, 358, 343, 362–367; 370/203, 210, 501, 509–515
See application file for complete search history.

(56) References Cited

U.S. PATENT DOCUMENTS

| | | | | |
|---|---|---|---|---|
| 8,761,299 B2 * | 6/2014 | Nishikawa | ..................... | 375/295 |
| 8,804,478 B2 * | 8/2014 | Han et al. | ..................... | 370/210 |
| 2004/0136464 A1 * | 7/2004 | Suh et al. | ..................... | 375/260 |
| 2009/0219802 A1 * | 9/2009 | Han et al. | ..................... | 370/210 |
| 2010/0080310 A1 * | 4/2010 | Moffatt et al. | ................. | 375/260 |
| 2010/0080312 A1 * | 4/2010 | Moffatt et al. | ................. | 375/260 |
| 2010/0329186 A1 * | 12/2010 | Lim et al. | ..................... | 370/328 |
| 2011/0013575 A1 * | 1/2011 | Liao et al. | ..................... | 370/329 |

FOREIGN PATENT DOCUMENTS

JP   2008-508803   3/2008

* cited by examiner

*Primary Examiner* — Tesfaldet Bocure
(74) *Attorney, Agent, or Firm* — Warner Norcross & Judd LLP (57) ABSTRACT

A first calculator generates first computational data by reordering elements in at least one of either a real data sequence or an imaginary data sequence constituting a data sequence having a number of elements determined according to a number of elements in a preamble model. A second calculator generates second computational data in which elements of data obtained by applying a fast Fourier transform to the first computational data are spaced apart by a designated number of elements. A preamble generator generates a preamble by multiplying each element of the second computational data by an element of the preamble model at a same position as the each element. A preamble determiner determines on the preamble as a preamble of the transmit signal in a case in which a peak-to-average power ratio of data obtained by applying an inverse fast Fourier transform to the preamble matches a predetermined criterion.

17 Claims, 9 Drawing Sheets

PREAMBLE GENERATING DEVICE, PREAMBLE GENERATING METHOD, AND NON-TRANSITORY COMPUTER-READABLE RECORDING MEDIUM STORING A PROGRAM

CROSS-REFERENCE TO RELATED APPLICATION

This application claims the benefit of Japanese Patent Application No. 2013-158966, filed on Jul. 31, 2013, the entire disclosure of which is incorporated by reference herein.

FIELD

This application relates to a preamble generating device, a preamble generating method, and a non-transitory computer-readable recording medium storing a program.

BACKGROUND

In communication using the orthogonal frequency-division multiplexing (OFDM) scheme, for example, a preamble used to detect and synchronize signals is added to the beginning of data constituting a transmit signal. If distortion occurs in the preamble due to the characteristics of the amplifier or the characteristics of the transmission channel, for example, the receiving end may become unable to correctly restore the subsequent data. Among amplifiers used on the transmitting end, amplifiers with a lower peak-to-average power ratio (PAPR) produce signals with less distortion. Since the PAPR rises if the sequence length of the preamble becomes longer, technology for generating a preamble with a low PAPR is being developed.

Unexamined Japanese Patent Application Publication (Translation of PCT Application) No. 2008-508803 discloses technology that generates a preamble based on a constant amplitude zero auto-correlation (CAZAC) sequence.

The preamble generated by the technology disclosed in Unexamined Japanese Patent Application Publication (Translation of PCT Application) No. 2008-508803 has a power of 2 length, and the preamble length cannot be set to an arbitrary length. The types of preambles that may be generated are also limited.

SUMMARY

The present invention, being devised in light of circumstances like the above, takes as an objective to reduce the PAPR of a preamble of arbitrary length.

In order to achieve the above object, a preamble generating device according to a first aspect of the present invention is a preamble generating device that generates a preamble of a transmit signal, comprising:

a model determiner that determines on a preamble model including a plurality of elements with a value of 0 or 1, according to a preamble requested for generation;

a first calculator that generates first computational data by reordering elements in at least one of either a real data sequence that is a real part of a data sequence having a number of elements determined according to a number of elements in the preamble model, or an imaginary data sequence that is an imaginary part of the data sequence;

a second calculator that generates second computational data in which elements of data obtained by applying a fast Fourier transform to the first computational data are spaced apart by a designated number of elements, the second computational data having a same number of elements as the number of elements in the preamble model;

a preamble generator that generates a preamble by multiplying each element of the second computational data by an element of the preamble model at a same position as the each element; and a preamble determiner that determines on the preamble as a preamble of the transmit signal in a case in which a peak-to-average power ratio of data obtained by applying an inverse fast Fourier transform to the preamble matches a predetermined criterion.

Preferably, the preamble generating device further comprises a process repeater that changes an order of elements in at least one of either the real data sequence or the imaginary data sequence when generating the first computational data, and repeats processing of the first calculator, the second calculator, and the preamble generator;

wherein the preamble determiner determines on a preamble of the transmit signal from among a plurality of preambles generated by the repeated processing of the process repeater.

Preferably, the process repeater executes the repeated processing in a case in which the peak-to-average power ratio of data obtained by applying the inverse fast Fourier transform to the preamble generated by the preamble generator does not match the predetermined criterion.

Preferably, in a case in which the preamble requested for generation is a long preamble, the model determiner determines, as the preamble model, a long preamble model comprising an alternating arrangement of an element with a value of 1 and an element with a value of 0 as subcarriers used for data communication, the first calculator generates the first computational data by reordering elements in at least one of either a real data sequence that is a real part of a data sequence having one-half a number of elements of the long preamble model, or an imaginary data sequence that is an imaginary part of the data sequence, and the second calculator generates, as the second computational data, data in which elements of data obtained by applying a fast Fourier transform to the first computational data are spaced one element apart.

Preferably, in a case in which the preamble requested for generation is a short preamble, the model determiner determines, as the preamble model, a short preamble model comprising an alternating arrangement of one element with a value of 1 and three elements with a value of 0 as subcarriers used for data communication, the first calculator generates the first computational data by reordering elements in at least one of either a real data sequence that is a real part of a data sequence having one-fourth a number of elements of the short preamble model, or an imaginary data sequence that is an imaginary part of the data sequence, and the second calculator generates, as the second computational data, data in which elements of data obtained by applying a fast Fourier transform to the first computational data are spaced three elements apart.

Preferably, the first calculator generates the first computational data by cyclically shifting each element of at least one of either the real data sequence or the imaginary data sequence a predetermined number of times in a predetermined direction.

Preferably, the preamble determiner determines on the preamble as a preamble of the transmit signal in a case in which the peak-to-average power ratio and autocorrelation of data obtained by applying an inverse fast Fourier transform to the preamble match predetermined criteria.

Preferably, the first calculator generates the first computational data using a sequence having a plurality of elements with equal absolute values as the data sequence.

A preamble generating method according to a second aspect of the present invention is a preamble generating method that generates a preamble of a transmit signal, comprising:

a model determining step that determines on a preamble model including a plurality of elements with a value of 0 or 1, according to a preamble requested for generation;

a first calculating step that generates first computational data by reordering elements in at least one of either a real data sequence that is a real part of a data sequence having a number of elements determined according to a number of elements in the preamble model, or an imaginary data sequence that is an imaginary part of the data sequence;

a second calculating step that generates second computational data in which elements of data obtained by applying a fast Fourier transform to the first computational data are spaced apart by a designated number of elements, the second computational data having a same number of elements as the number of elements in the preamble model;

a preamble generating step that generates a preamble by multiplying each element of the second computational data by an element of the preamble model at a same position as the each element; and a preamble determining step that determines on the preamble as a preamble of the transmit signal in a case in which a peak-to-average power ratio of data obtained by applying an inverse fast Fourier transform to the preamble matches a predetermined criterion.

A non-transitory computer-readable recording medium storing a program according to a third aspect of the present invention causes a computer that controls a preamble generating device that generates a preamble of a transmit signal to execute:

a model determining step that determines on a preamble model including a plurality of elements with a value of 0 or 1, according to a preamble requested for generation;

a first calculating step that generates first computational data by reordering elements in at least one of either a real data sequence that is a real part of a data sequence having a number of elements determined according to a number of elements in the preamble model, or an imaginary data sequence that is an imaginary part of the data sequence;

a second calculating step that generates second computational data in which elements of data obtained by applying a fast Fourier transform to the first computational data are spaced apart by a designated number of elements, the second computational data having a same number of elements as the number of elements in the preamble model;

a preamble generating step that generates a preamble by multiplying each element of the second computational data by an element of the preamble model at a same position as the each element; and a preamble determining step that determines on the preamble as a preamble of the transmit signal in a case in which a peak-to-average power ratio of data obtained by applying an inverse fast Fourier transform to the preamble matches a predetermined criterion.

According to the present invention, reducing the PAPR of a preamble of arbitrary length becomes possible.

BRIEF DESCRIPTION OF THE DRAWINGS

A more complete understanding of this application can be obtained when the following detailed description is considered in conjunction with the following drawings, in which.

DETAILED DESCRIPTION

Hereinafter, an exemplary embodiment of the present invention will be described in detail and with reference to the drawings. Note that in the drawings, the same signs are given to the same or similar parts.

In the following detailed description and claims of the present invention, the inverse fast Fourier transform (IFFT) is taken to be a concept that includes the IFFT and the inverse discrete Fourier transform (IDFT). Consequently, an embodiment of the present invention may also be configured to apply the IDFT instead of the IFFT. Similarly, the fast Fourier transform (FFT) is taken to be a concept that includes the FFT and the discrete Fourier transform (DFT). Also, in the case of applying the IDFT and the DFT, the FFT size in the following description means the DFT size.

Figure 1:
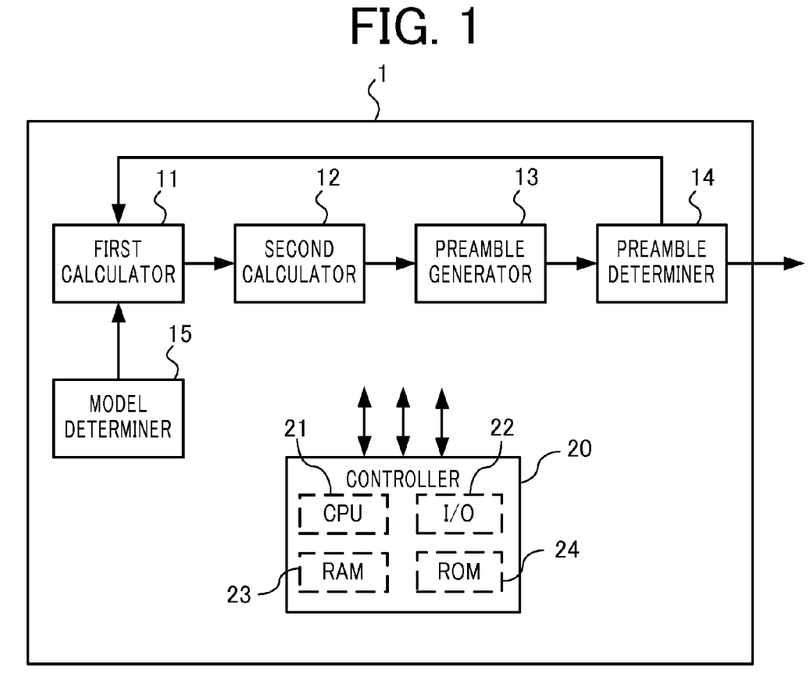
FIG. 1 is a block diagram illustrating an exemplary configuration of a preamble generating device according to an embodiment of the present invention.

FIG. 1 is a block diagram illustrating an exemplary configuration of a preamble generating device according to an embodiment of the present invention. The preamble generating device 1 is equipped with a first calculator 11, a second calculator 12, a preamble generator 13, a preamble determiner 14, a model determiner 15, and a controller 20.

The controller 20 is equipped with a central processing unit (CPU) 21, random access memory (RAM) 23, and read-only memory (ROM) 24. Signal lines from the controller 20 to each component are omitted to avoid complexity and ease comprehension, but the controller 20 is connected to each component of the preamble generating device 1 via input/output (I/O) 22, and controls the starting, ending, and content of processes conducted by each component. The ROM 24 stores a control program used by the controller 20 to control the operation of the preamble generating device 1. The controller 20 controls the preamble generating device 1 based on the control program.

Figure 2:
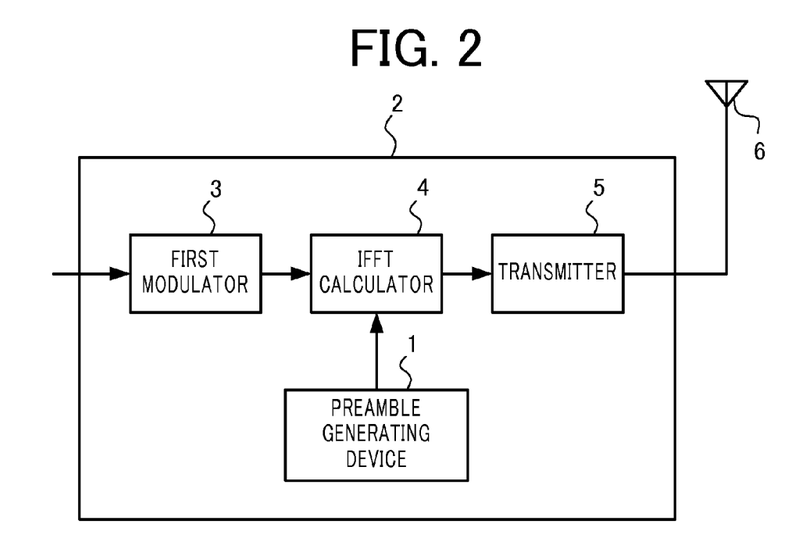
FIG. 2 is a block diagram illustrating an exemplary configuration of a communication device equipped with a preamble generating device according to an embodiment of the present invention.

FIG. 2 is a block diagram illustrating an exemplary configuration of a communication device equipped with a preamble generating device according to an embodiment. The communication device 2 is equipped with a preamble generating device 1, a primary modulator 3, an IFFT calculator 4, a transmitter 5, and an antenna 6. The communication device 2 communicates with another device by wireless communication in an orthogonal frequency-division multiplexing (OFDM) scheme, under control by components such as a CPU, RAM, and ROM (not illustrated).

The primary modulator 3 generates a primary-modulated signal by primary-modulating an input signal using a modulation scheme such as quadrature phase-shift keying (QPSK), for example. The IFFT calculator 4 calculates the IFFT of primary-modulated signal and the frequency-domain preamble output by the preamble generating device 1, and sends the IFFT calculation result to the transmitter 5. The transmitter 5 generates a baseband signal from the IFFT-transformed primary-modulated signal, and adds the IFFT-transformed frequency-domain preamble to the beginning of the baseband signal to generate a transmit signal. Subsequently, the transmitter 5 transmits the generated transmit signal to another device at the other end of the communication.

Figure 3:
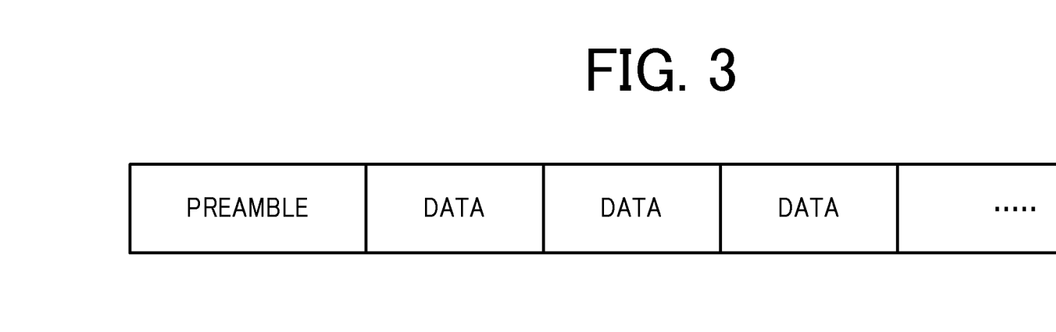
FIG. 3 is a diagram illustrating an exemplary configuration of a transmit signal transmitted by a communication device according to an embodiment.

FIG. 3 is a diagram illustrating an exemplary configuration of a transmit signal transmitted by a communication device according to an embodiment. As illustrated in FIG. 3, the transmit signal includes a preamble, and multiple data portions that correspond to a baseband signal.

The preamble is positioned at the beginning of the transmit signal, and is used for signal detection, correction, synchronization, and the like. The preamble may be constructed by combining a long preamble and a short preamble generated by the preamble generating device 1. For example, a long preamble and a short preamble are respectively used for rough adjustment and fine adjustment during signal detection or the like. Combinations of these preambles are freely determined according to usage, application, and the specifications of the communication scheme.

Figure 4:
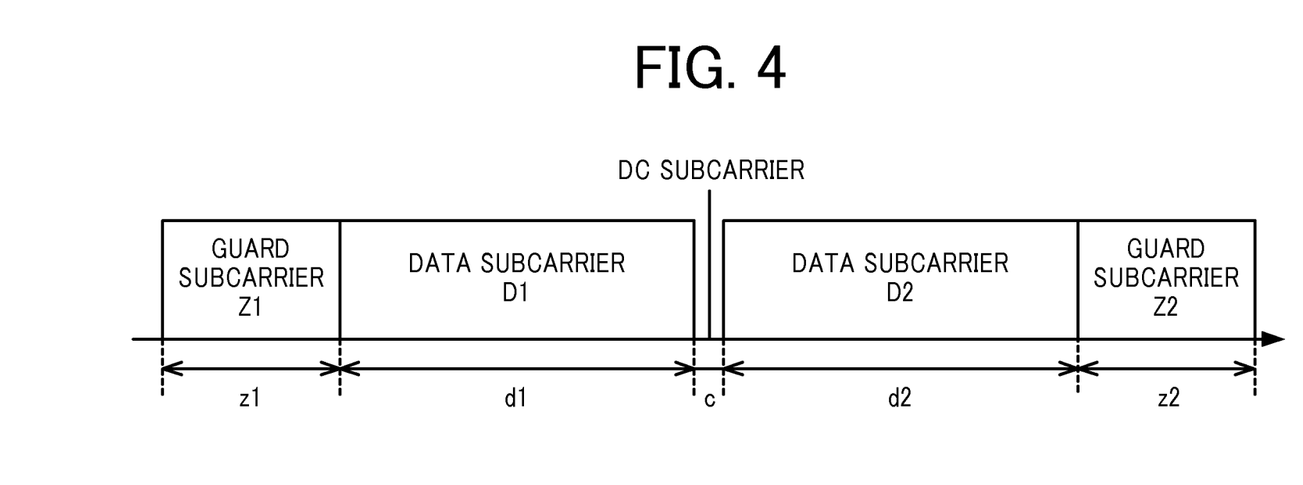
FIG. 4 is a diagram illustrating an exemplary configuration of a preamble according to an embodiment.

FIG. 4 is a diagram illustrating an exemplary configuration of a preamble according to an embodiment. As illustrated in FIG. 4, the preamble includes guard subcarriers Z1 and Z2, data subcarriers D1 and D2, and a DC subcarrier.

The guard subcarriers Z1 and Z2 are positioned at both ends of the preamble, and are subcarriers used to prevent interference between frequency bands, whose respective elements have values of 0. The data subcarriers D1 and D2 are positioned between the guard subcarriers Z1 and Z2 and the DC subcarrier, and are subcarriers used for data communication, or in other words, for expressing information to be transmitted to the other end of the communication. The DC subcarrier is positioned in the approximate center of the preamble, and is a subcarrier not used for data communication, with a value of 0.

For example, in the case of setting the number of elements included in the preamble (the sequence length) N to 2048, it is possible to set the sequence length z1 of the guard subcarrier Z1 to 184, the sequence length d1 of the data subcarrier D1 to 840, the sequence length c of the DC subcarrier to 1, the sequence length d2 of the data subcarrier D2 to 840, and the sequence length z2 of the guard subcarrier Z2 to 183. In this case, the relationship $N=z1+d1+c+d2+z2$ holds true.

Each component of the preamble generating device 1 will be described. The model determiner 15 determines on a model of a preamble requested for generation (a preamble model). A preamble model refers to a model including a plurality of elements with a value of 0 or 1 in the same numbers as the numbers of elements in a preamble requested for generation, and is a model that indicates which elements among the plurality of elements constituting the preamble are to be used for data communication, or in other words, which elements are to be allocated as each of the guard subcarriers Z1 and Z2, the data subcarriers D1 and D2, and the DC subcarrier.

Described more specifically, the model determiner 15 determines whether to use a long preamble model or a short preamble model as the preamble model, according to whether the type of preamble requested for generation is a long preamble or a short preamble. Note that the model determiner 15 may also determine on a preamble model based on external input, or determine on a preamble in accordance with a predetermined standard.

Figure 5:
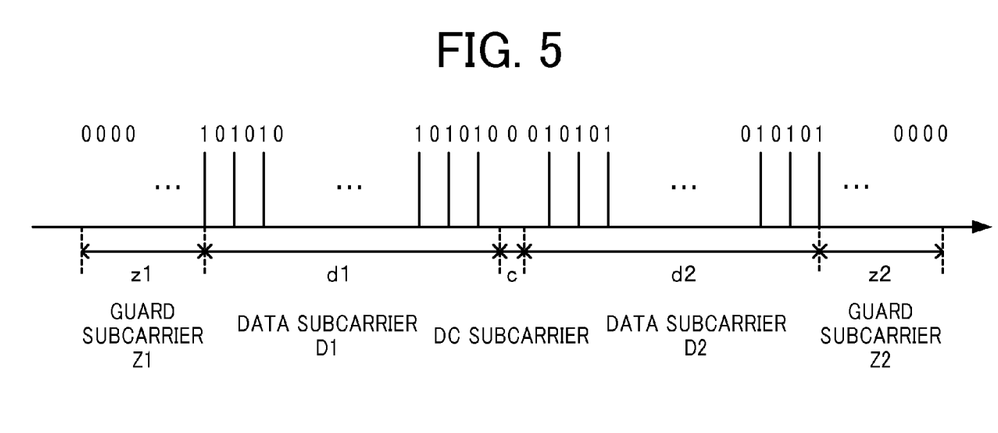
FIG. 5 is a diagram illustrating an example of a long preamble model according to an embodiment.
Figure 6:
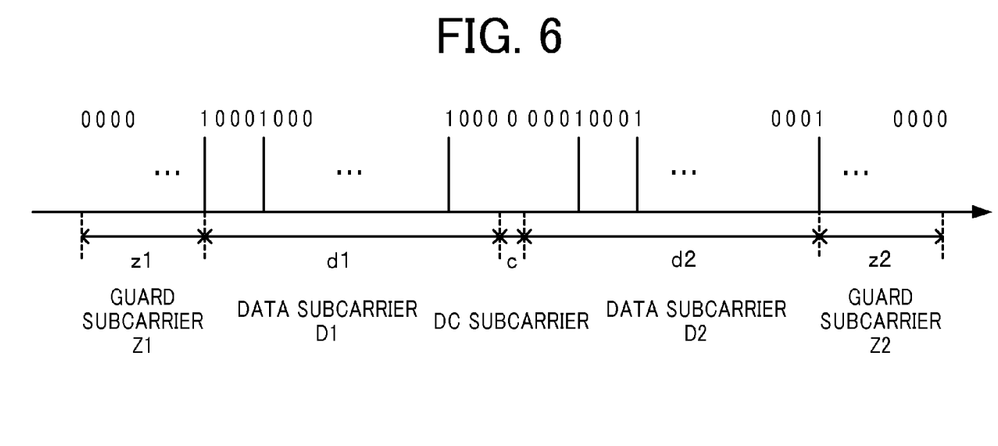
FIG. 6 is a diagram illustrating an example of a short preamble model according to an embodiment.

FIGS. 5 and 6 are diagrams illustrating examples of a long preamble model and a short preamble model according to an embodiment, respectively. As illustrated in FIGS. 5 and 6, the long preamble model and the short preamble model both include a number of elements z1 and z2 with respective values of 0 as the guard subcarrier Z1 and the guard subcarrier Z2 positioned at both ends of the model, and one element with a value of 0 as the DC subcarrier positioned in the approximate center of the model.

On the other hand, the arrangement patterns of elements with a value of 0 and elements with a value of 1 in the data subcarriers D1 and D2 mutually differ between the long preamble model and the short preamble model. For example, as illustrated in FIG. 5, the long preamble model includes d1 elements with 1, 0, 1, 0, 1, 0, . . . repeating as the data subcarrier D1, and d2 elements with 0, 1, 0, 1, 0, 1, . . . repeating as the data subcarrier D2. In contrast, as illustrated in FIG. 6, the short preamble model includes d1 elements with 1, 0, 0, 0, 1, 0, 0, 0, . . . repeating as the data subcarrier D1, and d2 elements with 0, 0, 0, 1, 0, 0, 0, 1, . . . repeating as the data subcarrier D2.

In this way, in the case in which the preamble requested for generation is a long preamble, the model determiner 15 determines, as the preamble model, a long preamble model comprising an alternating arrangement of an element with a value of 1 and an element with a value of 0 as the elements in the sections of the data subcarriers D1 and D2 used for data communication. Meanwhile, in the case in which the preamble requested for generation is a short preamble, the model determiner 15 determines, as the preamble model, a short preamble model comprising a repeating arrangement of one element with a value of 1 and three elements with a value of 0 as the data subcarriers D1 and D2 used for data communication.

The model determiner 15 sends the long preamble model or short preamble model determined as the preamble model to the first calculator 11. Note that the first calculator 11 may also be configured to acquire the long preamble model or short preamble model determined as the preamble model by the model determiner 15 by having the model determiner 15 store a determined preamble model in the RAM 23, and having the first calculator 11 acquire a preamble model stored in the RAM 23.

Returning to the description of each component of the preamble generating device 1, the first calculator 11 generates first computational data by reordering elements in at least one of either a real data sequence, which is a real part of a data sequence having a number of elements determined according to the number of elements in a preamble model, or an imaginary data sequence, which is an imaginary part of the data sequence.

For the data sequence, an arbitrary signal may be used, such as a random signal, a constant amplitude zero auto-correlation (CAZAC) sequence, a pseudorandom noise (PN) sequence, or some other artificially generated sequence, for example. However, the use of a signal with as low a peak-to-average power ratio (PAPR) as possible is preferable, in order to lower the PAPR of the preamble to be generated.

Figure 7:
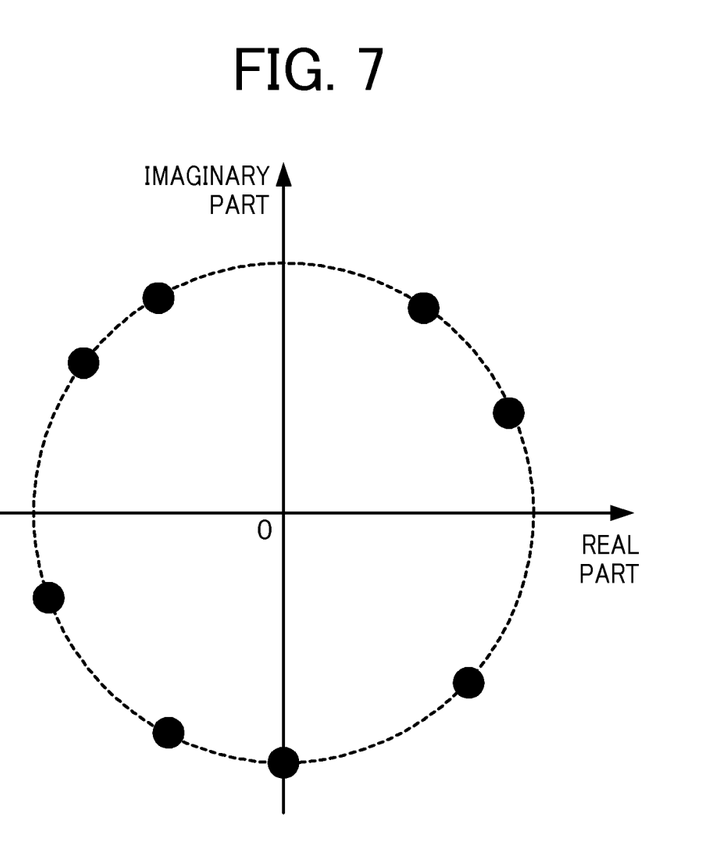
FIG. 7 is a diagram illustrating a data sequence according to an embodiment in the complex plane.

FIG. 7 is a diagram illustrating elements of a data sequence according to an embodiment in the complex plane. In FIG. 7, the black circles represent respective elements of a data sequence. As illustrated in FIG. 7, a sequence whose respective elements are positioned on the circumference of a circle centered on the origin in the complex plane, or in other words, a sequence whose respective elements have equal absolute values, may be used as the data sequence, for example. For such a sequence whose respective elements have equal absolute values, the PAPR of the sequence becomes 0 dB according to the definition of the PAPR. Consequently, such a sequence is ideal as a data sequence for generating a preamble with a low PAPR.

Also, as an example of a process that reorders the elements in at least one of either the real data sequence or the imaginary data sequence in such a data sequence, the following will describe a case in which the first calculator 11 cyclically shifts each element in at least one of either the real data sequence or the imaginary data sequence a predetermined number of times in a predetermined direction.

Figure 8:
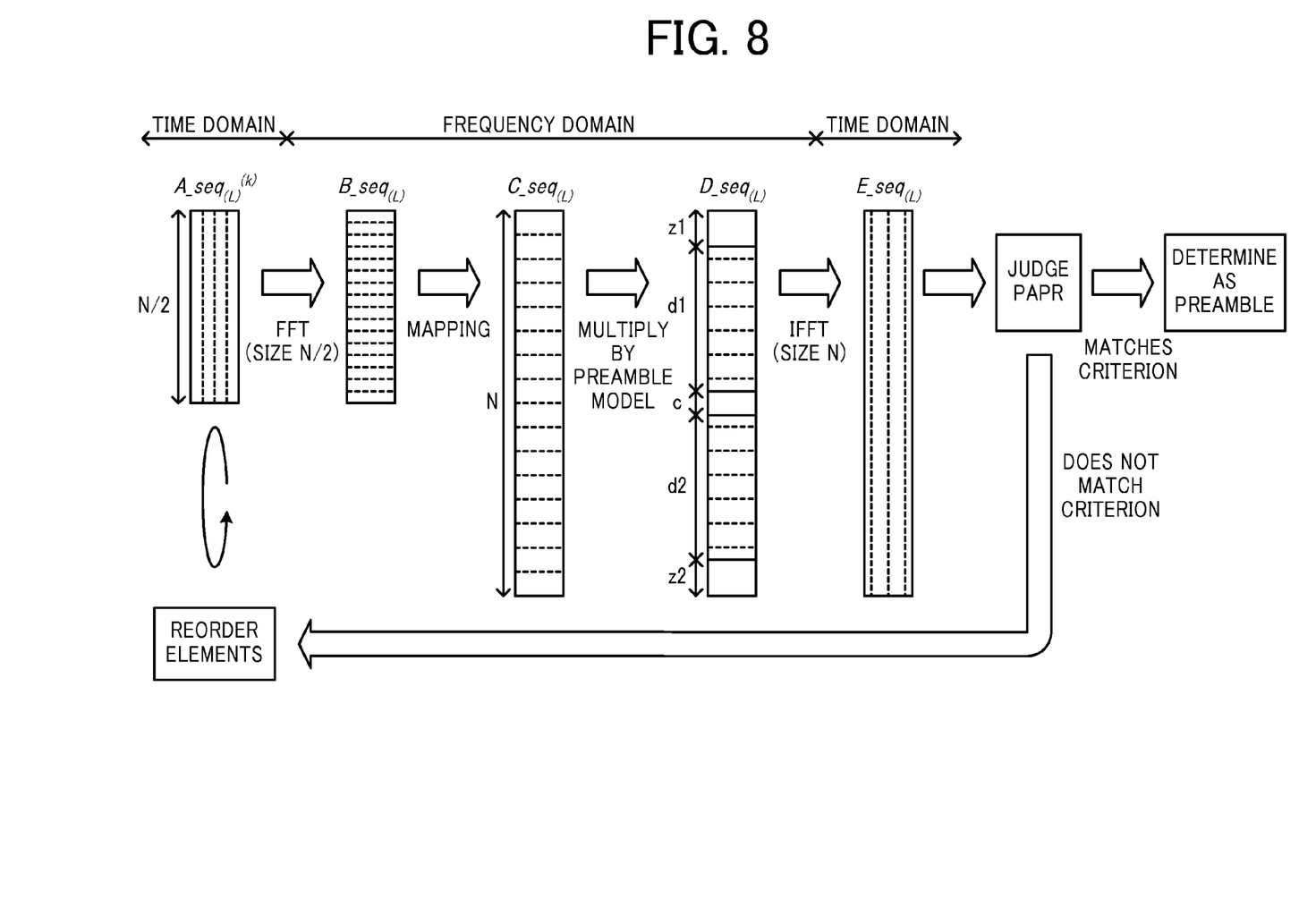
FIG. 8 is a diagram illustrating a procedure for generating a long preamble according to an embodiment.

FIG. 8 is a diagram illustrating a procedure for generating a long preamble according to an embodiment. Hereinafter, FIG. 8 will be referenced to describe a case of generating a long preamble of N elements as the preamble. Note that in order to ease understanding, in FIG. 8, data with more elements is drawn longer in the vertical direction, with dashed lines applied vertically to data in the time domain, and dashed lines applied horizontally to data in the frequency domain.

In the case in which the preamble requested for generation is a long preamble, the first calculator 11 uses a data sequence having N/2 elements, which is half of the N elements in the long preamble model supplied from the model determiner 15. Herein, let $A\_seq_{(L)}$ represent a data sequence as a column vector with N/2 elements, let $Re(A\_seq_{(L)})$ represent the real data sequence that is the real part of the data sequence $A\_seq_{(L)}$, and let $Im(A\_seq_{(L)})$ represent the imaginary data sequence that is the imaginary part. For example, the first calculator 11 cyclically shifts the imaginary data sequence $Im(A\_seq_{(L)})$ k times in the upward direction when the elements are arranged from top to bottom, and generates first computational data $A\_seq_{(L)}^{(k)}$ from the data sequence $A\_seq_{(L)}$. The first calculator 11 sends the generated first computational data $A\_seq_{(L)}^{(k)}$ to the second calculator 12.

Cyclically shifting the elements of the imaginary data sequence $Im(A\_seq_{(L)})$ k times in the upward direction means cycling the respective elements of the imaginary data sequence $(A\_seq_{(L)})$ so that the pth element of the N/2 elements in the imaginary data sequence $Im(A\_seq_{(L)})$ becomes the (p−k)th element (where p is an integer satisfying k<p≤N/2), and the qth element becomes the (q−k+N/2)th element (where q is an integer satisfying 0<q≤k). If an imaginary data sequence cyclically shifted k times in the upward direction is expressed as $Circ(Im(A\_seq_{(L)}), k)$, the first computational data $A\_seq_{(L)}^{(k)}$ is expressed by the following equation (1). Note that in the following equation (1), j represents the imaginary unit.

[Eq. 1]

$$A\_seq_{(L)}^{(k)} = Re(A\_seq_{(L)}) + j \cdot Circ(Im(A\_seq)_{(L)}, k) \quad (1)$$

The second calculator 12 applies the FFT to the first computational data $A\_seq_{(L)}^{(k)}$ with a cyclically shifted imaginary data sequence, transforming the data into data $B\_seq_{(L)}$ in a format in the frequency domain. The data $B\_seq_{(L)}$ obtained by applying the FFT is expressed like in the following equation (2). Note that the FFT size is the same N/2 as the sequence length of the data sequence $A\_seq_{(L)}$ and the first computational data $A\_seq_{(L)}^{(k)}$. In the following equation (2), $F^{(N/2)}$ represents an FFT matrix with an FFT size of N/2.

[Eq. 2]

$$B\_seq_{(L)} = F_{(N/2)} \cdot A\_seq_{(L)}^{(k)} \quad (2)$$

After applying the FFT, the second calculator 12 maps the elements of the FFT-transformed data $B\_seq_{(L)}$ to elements with a value of 1 in a sequence LP_1 of sequence length N comprising an alternating arrangement of an element with a value of 1 and an element with a value of 0, like 1, 0, 1, 0, 1, 0, . . . , 1, 0. Subsequently, there is generated second computational data $C\_seq_{(L)}$ in which the elements of the FFT-transformed data $B\_seq_{(L)}$ are arranged every other element, the second computational data $C\_seq_{(L)}$ having a same number of elements as the number of elements N in the long preamble model. For example, if the N/2 elements of the FFT-transformed data $B\_seq_{(L)}$ are expressed as $b_1$, $b_2$, $b_3$, . . . , $b_{N/2}$, the N elements of the second computational data $C\_seq_{(L)}$ are expressed as a sequence in which one element with a value of 0 has been inserted between every element and at the end of the FFT-transformed data $B\_seq_{(L)}$, like $b_1$, 0, $b_2$, 0, $b_3$, 0, . . . , $b_{N/2}$, 0. The second calculator 12 sends the generated second computational data $C\_seq_{(L)}$ to the preamble generator 13.

The preamble generator 13 multiples each element of the second computational data $C\_seq_{(L)}$ by the element of the long preamble model at the same position as each corresponding element. In other words, the ith elements (where i is an integer from 1 to N) in each of the first computational data $C\_seq_{(L)}$ and the long preamble model are multiplied together (Hadamard product). Subsequently, there is generated a preamble $D\_seq_{(L)}$ in the frequency domain made up of N elements. If the long preamble model is expressed as LP_seq, the preamble $D\_seq_{(L)}$ is expressed in the following equation (3). Note that in the following equation (3), the black circle represents the Hadamard product.

[Eq. 3]

$$D\_seq_{(L)} = C\_seq_{(L)} \cdot LP\_seq \quad (3)$$

As discussed above, the long preamble model LP_seq includes a plurality of elements with a value of 0 or 1. For this reason, the elements of the second computational data $C\_seq_{(L)}$ that exist at the same positions as elements with a value of 1 in the long preamble model LP_seq are retained in the preamble $D\_seq_{(L)}$. Additionally, the elements of the second computational data $C\_seq_{(L)}$ that exist at the same positions as elements with a value of 0 in the long preamble model LP_seq become 0 in the preamble $D\_seq_{(L)}$. Elements with a value of 0 in the long preamble model LP_seq are, for example, all elements in the guard subcarriers Z1 and Z2 and the DC subcarrier, and elements with a value of 0 in the data subcarriers D1 and D2. Elements with a value of 1 in the long preamble model LP_seq are the elements with a value of 1 arranged every other element in the data subcarriers D1 and D2. The preamble generator 13 sends the generated preamble $D\_seq_{(L)}$ to the preamble determiner 14.

The preamble determiner 14 applies the IFFT to the preamble $D\_seq_{(L)}$ in the frequency domain, transforming the generated preamble into data $E\_seq_{(L)}$ in a format in the time domain. The data $E\_seq_{(L)}$ obtained by applying the IFFT is expressed like in the following equation (4). Note that in the following equation (4), $F^{(N)-1}$ represents an IFFT matrix with an FFT size of N.

[Eq. 4]

$$E\_seq_{(L)} = F^{(N)-1} \cdot D\_seq_{(L)} \qquad (4)$$

After applying the IFFT, the preamble determiner 14 computes the PAPR of the data $E\_seq_{(L)}$ obtained by applying the IFFT. In the case in which the computed PAPR matches a predetermined criterion, the preamble determiner 14 determines on this preamble $D\_seq_{(L)}$ as the long preamble of the transmit signal in the communication device 2. Subsequently, the determined long preamble is output to the IFFT calculator 4 of the communication device 2.

For example, the preamble determiner 14 judges that the PAPR of the IFFT-transformed data $E\_seq_{(L)}$ matches a predetermined criterion in the case in which the PAPR is less than or equal to a designated threshold value. The threshold value may be arbitrarily determined according to factors such as the performance of the amplifier in the communication device on the transmitting end, or the transmission channel.

On the other hand, in the case in which the PAPR of the IFFT-transformed data $E\_seq_{(L)}$ does not match the predetermined criterion, the preamble determiner 14 gives notice of this result to the first calculator 11. Upon receiving this notice, the first calculator 11 generates new first computational data $A\_seq_{(L)}^{(k)}$ by changing the cyclic shift count k to change an order of the elements of the imaginary data sequence $Im(A\_seq_{(L)})$ when generating the first computational data $A\_seq_{(L)}^{(k)}$. Subsequently, the second calculator 12 and the preamble generator 13 conduct the processes discussed above based on the new first computational data $A\_seq_{(L)}^{(k)}$, and the preamble determiner 14 judges whether or not the PAPR of newly generated, IFFT-transformed data $E\_seq_{(L)}$ matches the predetermined criterion.

The controller 20 functions as a process repeater that changes the cyclic shift count k and repeats the preamble generation process, generating a plurality of preambles by repeating the processing of the first calculator 11, the second calculator 12, and the preamble generator 13. Subsequently, the preamble determiner 14 determines on a preamble whose PAPR matches the predetermined criterion from among the plurality of preambles generated by the repeated processing as the preamble of the transmit signal.

For example, the controller 20 may be configured to set the initial value of the cyclic shift count in the first calculator 11 to 0, and in the case in which the PAPR of the IFFT-transformed data $E\_seq_{(L)}$ does not match the predetermined criterion, the controller 20 increments k by 1 and repeats the processing of the first calculator 11, the second calculator 12, and the preamble generator 13 until the PAPR of the IFFT-transformed data $E\_seq_{(L)}$ is judged to match the predetermined criterion.

Note that, in addition to the PAPR, the preamble determiner 14 may also compute the autocorrelation of the $E\_seq_{(L)}$ obtained by applying the IFFT to the preamble $D\_seq_{(L)}$ in the frequency domain, and determine on the preamble $D\_seq_{(L)}$ as the preamble of the transmit signal in the case in which the PAPR and the autocorrelation match predetermined criteria.

For example, in the case in which the autocorrelation between the IFFT-transformed data $E\_seq_{(L)}$ and the same data whose elements are not cyclically shifted from this data $E\_seq_{(L)}$ is high compared to the autocorrelation with data whose elements are arbitrarily cyclically shifted, the preamble determiner 14 may judge that the autocorrelation of this data $E\_seq_{(L)}$ matches a predetermined criterion. By deciding on data with good autocorrelation as the preamble of the transmit signal in this way, data detection precision of the transmit signal on the receiving end may be raised.

Figure 9:
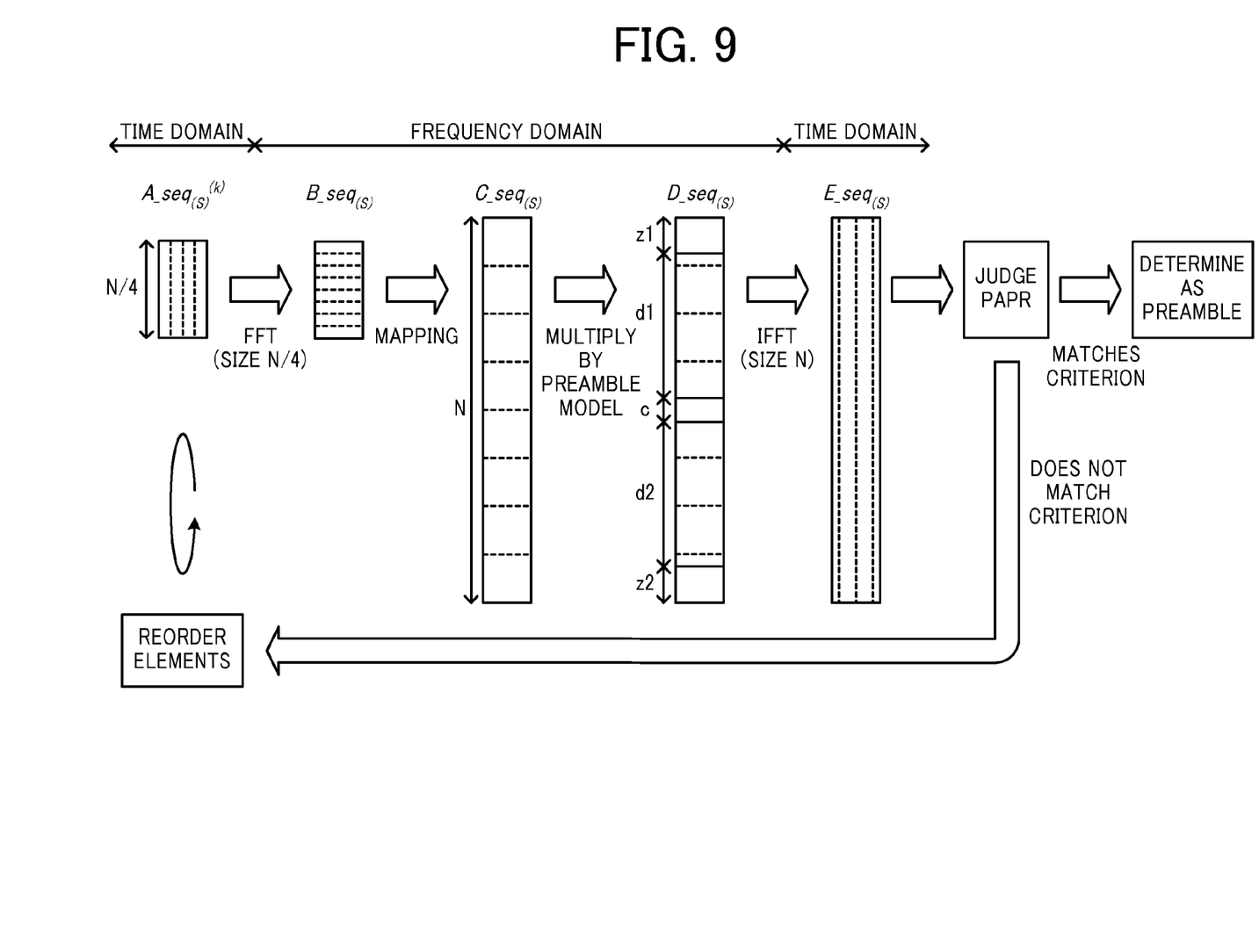
FIG. 9 is a diagram illustrating a procedure for generating a short preamble according to an embodiment.

FIG. 9 is a diagram illustrating a procedure for generating a short preamble according to an embodiment. The layout of the diagram is similar to FIG. 8. Hereinafter, FIG. 9 will be referenced to describe a case of using a short preamble model of N elements as the preamble model.

In the case in which the preamble requested for generation is a short preamble, the first calculator 11 uses a data sequence having N/4 elements, which is one-fourth of the N elements in the short preamble model supplied from the model determiner 15. Herein, let $A\_seq_{(S)}$ represent a data sequence as a column vector with N/4 elements, let $Re(A\_seq_{(S)})$ represent the real data sequence that is the real part of the data sequence $A\_seq_{(S)}$, and let $Im(A\_seq_{(S)})$ represent the imaginary data sequence that is the imaginary part. For example, the first calculator 11 cyclically shifts the imaginary data sequence $Im(A\_seq_{(S)})$ k times in the upward direction when the elements are arranged from top to bottom, and generates first computational data $A\_seq_{(S)}^{(k)}$ from the data sequence $A\_seq_{(S)}$. The first calculator 11 sends the generated first computational data $A\_seq_{(S)}^{(k)}$ to the second calculator 12.

Cyclically shifting the elements of the imaginary data sequence $Im(A\_seq_{(S)})$ k times in the upward direction means cycling the respective elements of the imaginary data sequence $(A\_seq_{(S)})$ so that the pth element of the N/4 elements in the imaginary data sequence $Im(A\_seq_{(S)})$ becomes the (p−k)th element (where p is an integer satisfying k<p≤N/4), and the qth element becomes the (q−k+N/4)th element (where q is an integer satisfying 0<q≤k). If an imaginary data sequence cyclically shifted k times in the upward direction is expressed as $Circ(Im(A\_seq_{(S)}), k)$, the first computational data $A\_seq_{(S)}^{(k)}$ is expressed by the following equation (5). Note that in the following equation (5), j represents the imaginary unit.

[Eq. 5]

$$A\_seq_{(S)}^{(k)} = Re(A\_seq_{(S)}) + j \cdot Circ(Im(A\_seq)_{(S)}, k) \qquad (5)$$

The second calculator 12 applies the FFT to the first computational data $A\_seq_{(S)}^{(k)}$ with a cyclically shifted imaginary data sequence, converting the data into data $B\_seq_{(S)}$ in a format in the frequency domain. The data $B\_seq_{(S)}$ obtained by applying the FFT is expressed like in the following equation (6). Note that the FFT size is the same N/4 as the sequence length of the data sequence $A\_seq_{(S)}$ and the first computational data $A\_seq_{(S)}^{(k)}$. In the following equation (6), $F^{(N/4)}$ represents an FFT matrix with an FFT size of N/4.

[Eq. 6]

$$B\_seq_{(S)} = F^{(N/4)} \cdot A\_seq_{(S)}^{(k)} \qquad (6)$$

After applying the FFT, the second calculator 12 maps the elements of the FFT-transformed data $B\_seq_{(S)}$ to elements with a value of 1 in a sequence SP_1 of sequence length N comprising an alternating arrangement of one element with a value of 1 and three elements with a value of 0, like 1, 0, 0, 0, 1, 0, 0, 0, . . . , 1, 0, 0, 0. Subsequently, there is generated second computational data $C\_seq_{(S)}$ in which the elements of the FFT-transformed data $B\_seq_{(S)}$ are spaced three elements apart, the second computational data $C\_seq_{(S)}$ having a same number of elements as the number of elements N in the short preamble model. For example, if the N/4 elements of the FFT-transformed data $B\_seq_{(S)}$ are expressed as $b_1$, $b_2$, $b_3$, ..., $b_{N/4}$, the N elements of the second computational data $C\_seq_{(S)}$ are expressed as a sequence in which three elements with a value of 0 have been inserted between every element and at the end of the FFT-transformed data $B\_seq_{(S)}$, like $b_1$, 0, 0, 0, $b_2$, 0, 0, 0, $b_3$, 0, 0, 0, ..., $b_{N/4}$, 0, 0, 0. The second calculator 12 sends the generated second computational data $C\_seq_{(S)}$ to the preamble generator 13.

The preamble generator 13 multiples each element of the second computational data $C\_seq_{(S)}$ by the element of the short preamble model at the same position as each corresponding element. In other words, the ith elements (where i is an integer from 1 to N) in each of the first computational data $C\_seq_{(S)}$ and the short preamble model are multiplied together (Hadamard product). Subsequently, there is generated a preamble $D\_seq_{(S)}$ in the frequency domain made up of N elements. If the short preamble model is expressed as $SP\_seq$, the preamble $D\_seq_{(S)}$ is expressed in the following equation (7). Note that in the following equation (7), the black circle represents the Hadamard product.

[Eq. 7]

$$D\_seq_{(S)} = C\_seq_{(S)} \bullet SP\_seq \qquad (7)$$

As discussed above, the short preamble model $SP\_seq$ includes a plurality of elements with a value of 0 or 1. For this reason, the elements of the second computational data $C\_seq_{(S)}$ that exist at the same positions as elements with a value of 1 in the short preamble model $SP\_seq$ are retained in the preamble $D\_seq_{(S)}$. Additionally, the elements of the second computational data $C\_seq_{(S)}$ that exist at the same positions as elements with a value of 0 in the short preamble model $SP\_seq$ become 0 in the preamble $D\_seq_{(S)}$. Elements with a value of 0 in the short preamble model $SP\_seq$ are, for example, all elements in the guard subcarriers Z1 and Z2 and the DC subcarrier, and elements with a value of 0 in the data subcarriers D1 and D2. Elements with a value of 1 in the short preamble model $SP\_seq$ are the elements with a value of 1 spaced three elements apart in the data subcarriers D1 and D2. The preamble generator 13 sends the generated preamble $D\_seq_{(S)}$ to the preamble determiner 14.

The preamble determiner 14 applies the IFFT to the preamble $D\_seq_{(S)}$ in the frequency domain, and converts the generated preamble into data $E\_seq_{(S)}$ in a format in the time domain. The data $E\_seq_{(S)}$ obtained by applying the IFFT is expressed like in the following equation (8). Note that in the following equation (8), $F^{(N)-1}$ represents an IFFT matrix with an FFT size of N.

[Eq. 8]

$$E\_seq_{(S)} = F^{(N)-1} \cdot D\_seq_{(S)} \qquad (8)$$

After applying the IFFT, the preamble determiner 14 computes the PAPR of the data $E\_seq_{(S)}$ obtained by applying the IFFT. In the case in which the computed PAPR matches a predetermined criterion, the preamble determiner 14 determines on this preamble $D\_seq_{(S)}$ as the short preamble of the transmit signal in the communication device 2. Subsequently, the determined short preamble is output to the IFFT calculator 4 of the communication device 2.

For example, similarly to the long preamble generation procedure, the preamble determiner 14 judges that the PAPR of the IFFT-transformed data $E\_seq_{(S)}$ matches a predetermined criterion in the case in which the PAPR is less than or equal to a designated threshold value. The threshold value may be arbitrarily determined according to factors such as the performance of the amplifier in the communication device on the transmitting end, or the transmission channel.

In addition to the PAPR, the preamble determiner 14 may also compute the autocorrelation of the $E\_seq_{(S)}$ obtained by applying the IFFT to the preamble $D\_seq_{(S)}$ in the frequency domain, determine on the preamble $D\_seq_{(S)}$ as the preamble of the transmit signal in the case in which the PAPR and the autocorrelation match predetermined criteria, and output the determined preamble $D\_seq_{(S)}$ to the IFFT calculator 4 of the communication device 2.

Also, in the case in which the PAPR of the IFFT-transformed data $E\_seq_{(S)}$ does not match the predetermined criterion, similarly to the long preamble generation procedure, the first calculator 11 changes the cyclic shift count k to change an order of the elements of the imaginary data sequence $Im(A\_seq_{(S)})$ when generating the first computational data $A\_seq_{(S)}^{(k)}$, and the processing of the first calculator 11, the second calculator 12, and the preamble generator 13 is repeated. Subsequently, the preamble determiner 14 determines on a preamble whose PAPR matches the predetermined criterion from among a plurality of preambles generated by the repeated processing as the preamble of the transmit signal.

Figure 10:
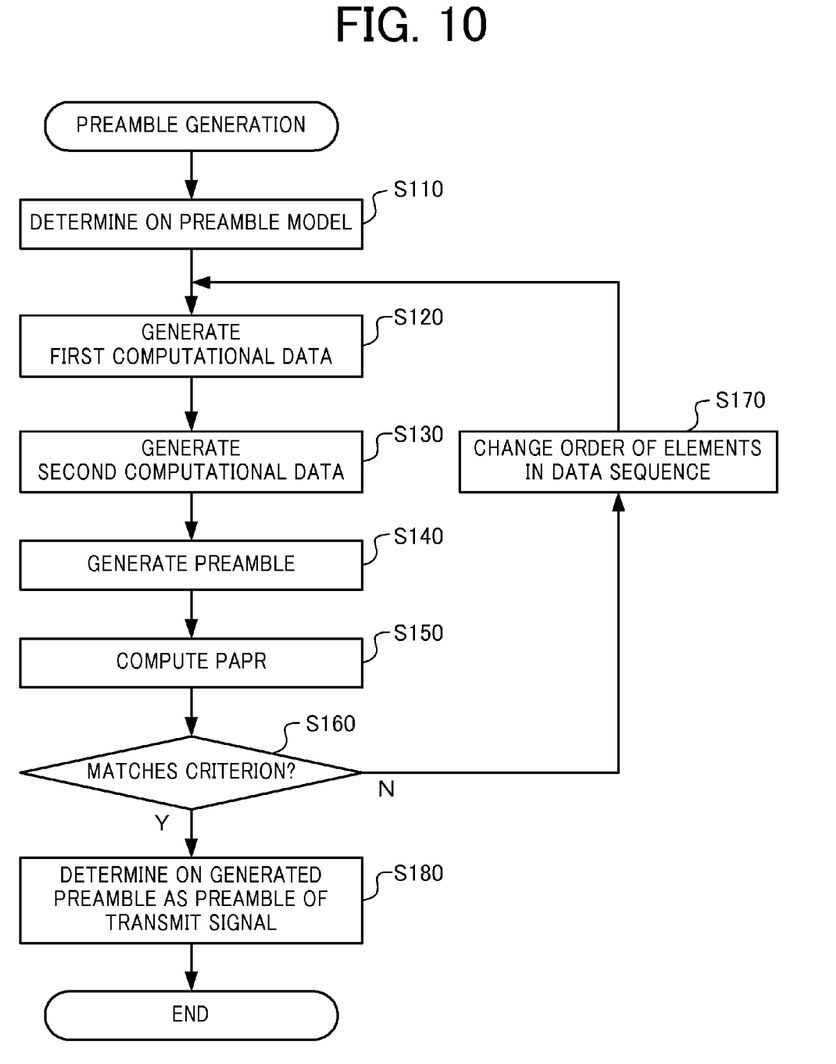
FIG. 10 is a flowchart illustrating an example of preamble generating operations conducted by a preamble generating device according to an embodiment.

FIG. 10 is a flowchart illustrating an example of preamble generating operations conducted by a preamble generating device according to an embodiment.

The preamble generation process in the preamble generating device 1 starts when triggered by receiving a preamble generation request by input from a user, or every time a designated timing for generating a preamble is reached, such as when a transmit signal is generated in the communication device 2, for example.

When the preamble generation process starts, the model determiner 15 determines on a preamble model including a plurality of elements of 0 or 1, according to the preamble requested for generation (step S110). For example, in the case in which the generation of a long preamble is requested, the model determiner 15 determines on the long preamble model including 0 and 1 elements arranged in a pattern like that illustrated in FIG. 5 as the preamble model. In the case in which the generation of a short preamble is requested, the model determiner 15 determines on the short preamble model including 0 and 1 elements arranged in a pattern like that illustrated in FIG. 6 as the preamble model.

After the preamble model is determined, the first calculator 11 generates first computational data by reordering elements in at least one of either a real data sequence, which is the real part of a data sequence having a number of elements determined according to the number of elements in a preamble model, or an imaginary data sequence, which is the imaginary part (step S120). For example, according to whether the preamble requested for generation is a long preamble or a short preamble, the first calculator 11 generates first computational data by using a data sequence with one-half or one-fourth the number of elements in the preamble model, and cyclically shifting one of either the real data sequence or the imaginary data sequence in this data sequence a predetermined number of times in a predetermined direction.

After the first computational data is generated, the second calculator 12 applies the FFT to the first computational data, and generates second computational data in which elements of the data obtained by applying the FFT spaced apart by a designated number of elements, the second computational data having a same number of elements as the number of elements in the preamble model (step S130). For example, according to whether the preamble requested for generation is a long preamble or a short preamble, the second calculator 12 generates, as the second computational data, data in which elements of the data obtained by applying the FFT to the first computational data are spaced one element apart or three elements apart.

After the second computational data is generated, the preamble generator 13 multiplies each element of the second computational data by the element of the preamble model at a same position as the each element to generate a preamble in the frequency domain (step S140).

After the preamble is generated, the preamble determiner 14 applies the IFFT to the generated preamble, and computes the PAPR of the data obtained by applying the IFFT (step S150). Subsequently, the preamble determiner 14 judges whether or not the computed PAPR matches a predetermined criterion (step S160).

In the case in which the computed PAPR does not match the predetermined criterion (step S160; N), the first calculator 11 changes the cyclic shift count to change an order of the elements in the data sequence when generating the first computational data (step S170). The preamble generation process returns to step S120, the processing of the first calculator 11, the second calculator 12, and the preamble generator 13 is repeated, and a new preamble based on a reordered data sequence is generated. Subsequently, the preamble determiner 14 computes the PAPR every time a new preamble is generated, and judges whether or not the computed PAPR matches the predetermined criterion.

Over the course of such repeated processing, in the case in which the computed PAPR matches the predetermined criterion (step S160; Y), the preamble determiner 14 determines on the preamble generated by the preamble generator 13 as the preamble of the transmit signal (step S180), and outputs the determined preamble to the IFFT calculator 4 of the communication device 2.

Note that in addition to the PAPR, the preamble determiner 14 may also compute the autocorrelation of data obtained by applying the IFFT to the preamble in the frequency domain in step S140, and judge whether or not the PAPR and the autocorrelation match predetermined criteria in step S150.

As described above, according to the preamble generating device 1 in accordance with an embodiment, since various preambles may be generated based on an arbitrary data sequence, generating a preamble of arbitrary length with a low PAPR becomes possible. In addition, as discussed later, generating a preamble with desired characteristics, such as a preamble having autocorrelation and resistant to the effects of distortion on the channel, becomes possible.

Specific Examples

A preamble generating device 1 according to the embodiment discussed above was used to conduct a simulation of generating a preamble. Hereinafter, the simulation results will be described.

First, a simulation of generating a long preamble was conducted by using the long preamble model as the preamble model. In the simulation, a data sequence whose real data sequence and imaginary sequence are respective CAZAC sequences was used, the elements of the imaginary data sequence were cyclically shifted, and a long preamble with a sequence length N of 2048 was generated.

Figure 11:
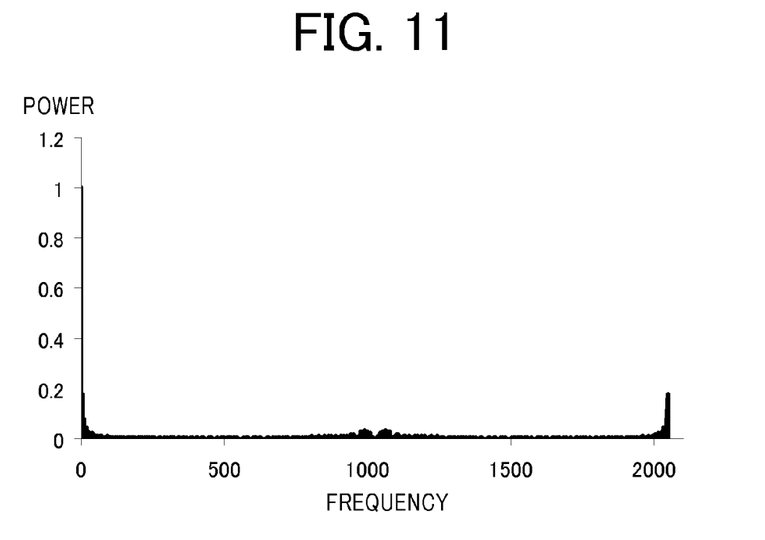
FIG. 11 is a diagram illustrating an example of long preamble autocorrelation according to an embodiment.

FIG. 11 is a diagram illustrating an example of long preamble autocorrelation according to an embodiment. The horizontal axis represents frequency (units: subcarrier interval f0), and the vertical axis represents a normalized power that indicates the degree of correlation. In FIG. 11, a peak in the correlation values is produced near a frequency of 0. For this reason, the autocorrelation between the long preamble generated by simulation and the same data whose elements are not cyclically shifted is high compared to the autocorrelation with data whose elements are cyclically shifted. Thus, FIG. 11 demonstrates that the long preamble generated by simulation has a high autocorrelation. Note that the PAPR of this long preamble is approximately 2.34 dB, demonstrating that the PAPR is comparatively low.

Figure 12:
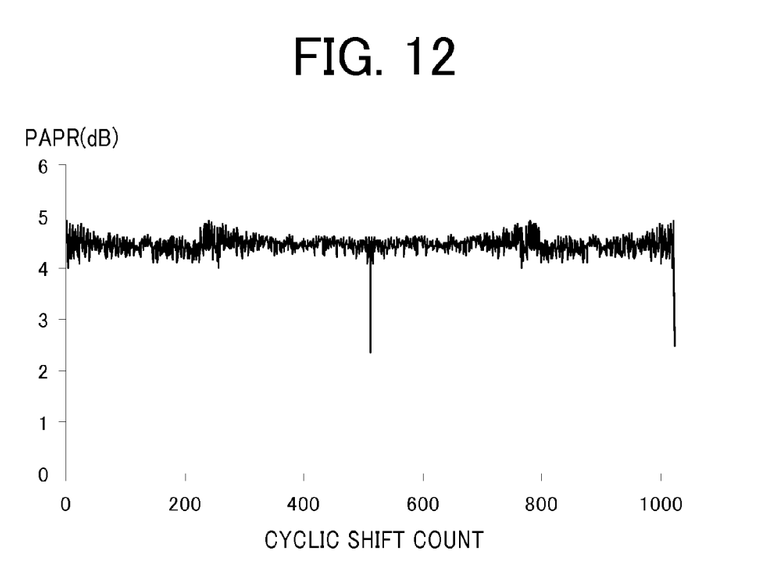
FIG. 12 is a diagram illustrating an example of the relationship between the cyclic shift count and the PAPR of a long preamble according to an embodiment.

FIG. 12 is a diagram illustrating an example of the relationship between the cyclic shift count and the PAPR of a long preamble according to an embodiment. The horizontal axis represents the cyclic shift count in the first calculator 11, and the vertical axis represents the PAPR (units: dB). The cyclic shift count takes a value from 0 to 1023 for a total of 1024 possibilities, which corresponds to one-half the sequence length of the data sequence. The PAPR varies according to the cyclic shift count, thus demonstrating that reducing the PAPR is possible by changing the cyclic shift count k and repeating the processing as discussed earlier.

Second, a simulation of generating a short preamble was conducted by using the short preamble model as the preamble model, and setting other conditions to the same as the simulation of generating a long preamble discussed above.

Figure 13:
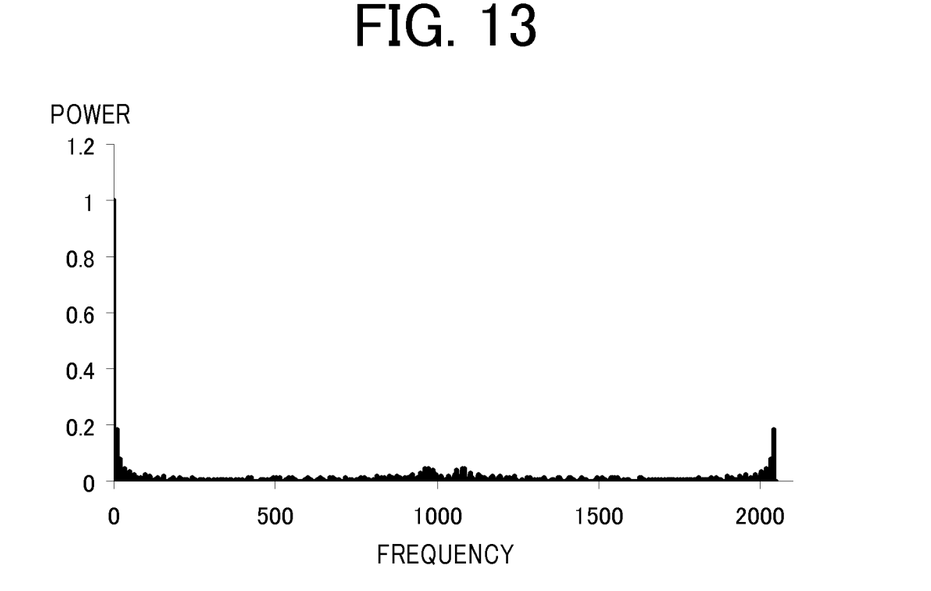
FIG. 13 is a diagram illustrating an example of short preamble autocorrelation according to an embodiment.

FIG. 13 is a diagram illustrating an example of short preamble autocorrelation according to an embodiment. The layout of the diagram is similar to FIG. 11. Similarly to FIG. 11, a peak in the correlation values is produced near a frequency of 0, demonstrating that the short preamble generated by the simulation has a high autocorrelation. Note that the PAPR of this short preamble is approximately 2.23 dB, demonstrating that the PAPR is comparatively low.

Figure 14:
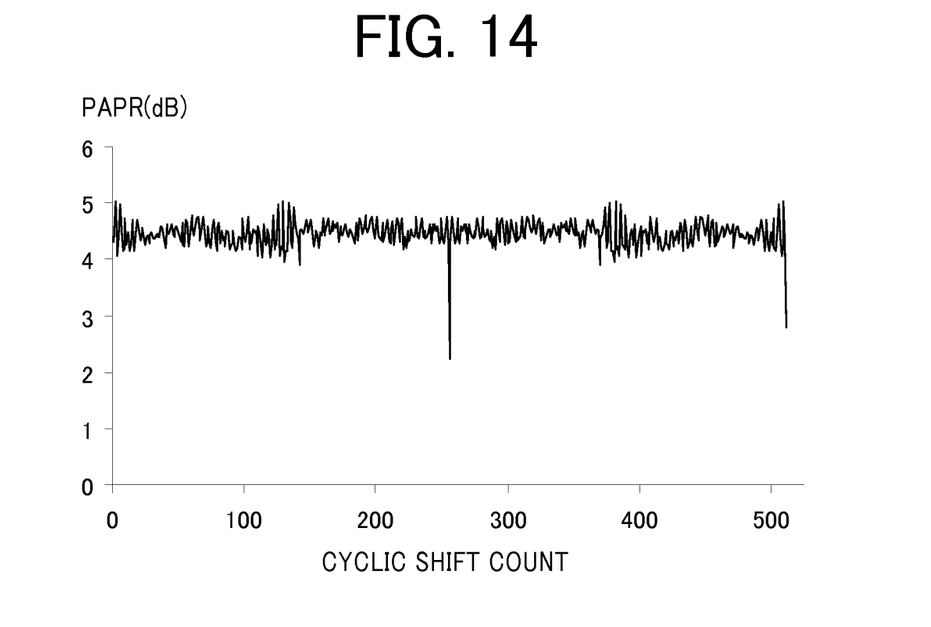
FIG. 14 is a diagram illustrating an example of the relationship between the cyclic shift count and the PAPR of a short preamble according to an embodiment.

FIG. 14 is a diagram illustrating an example of the relationship between the cyclic shift count and the PAPR of a short preamble according to an embodiment. The layout of the diagram is similar to FIG. 12. Note that the cyclic shift count takes a value from 0 to 511 for a total of 512 possibilities, which corresponds to one-fourth the sequence length of the data sequence. Similarly to FIG. 12, the PAPR varies according to the cyclic shift count, thus demonstrating that reducing the PAPR is possible by changing the cyclic shift count k and repeating the processing as discussed earlier.

The above simulations demonstrate that, according to an embodiment of the present invention, performing the computations discussed earlier makes it possible to generate a preamble having a low PAPR and a high autocorrelation.

Modifications

The foregoing thus describes an embodiment of the present invention, but an embodiment of the present invention is not limited to the embodiment discussed above. In other words, embodiments of the present invention may be applied in various ways, and all such embodiments are included in the scope of the present invention.

For example, each component of the preamble generating device 1 may also be configured to apply the IDFT instead of the IFFT, and configured to apply the DFT instead of the FFT.

In the foregoing embodiment, the preamble generating device 1 may generate any of a long preamble and a short preamble as requested. However, in cases in which the preamble is made up of only one of either a long preamble or a short preamble, for example, a preamble generating device according to the present invention may be configured to generate only one of either a long preamble or a short preamble.

The foregoing embodiment describes a case in which the first calculator 11 conducts a cyclical shift in the upward direction when elements in the imaginary data sequence from a data sequence are arranged from top to bottom as a process that changes the ordering of elements in a data sequence. However, the present invention may also be configured to cyclically shift elements in the real data sequence. In addition, the direction of the cyclic shift may be the reverse direction of the foregoing embodiment (downward direction). Furthermore, the configuration is not limited to a cyclic shift, and elements in at least one of the real data sequence and the imaginary data sequence may be reordered according to a predetermined rule, or randomly reordered.

In the foregoing embodiment, the preamble generating device 1 outputs a preamble in the frequency domain to the IFFT calculator 4 of the communication device 2 as the preamble requested for generation. Subsequently, the IFFT calculator 4 generates a transmit signal by applying the IFFT to a primary-modulated signal, while also applying the IFFT to the preamble in the frequency domain that was output from the preamble generating device 1. However, a preamble generating device according to the present invention may also be configured to output a preamble in the time domain to the transmitter 5 of the communication device 2 as the preamble requested for generation. In this case, the transmitter 5 generates the transmit signal by combining the IFFT-transformed primary-modulated signal and the preamble in the time domain that was output from the preamble generating device 1. For example, the data $E\_seq_{(L)}$ or $E\_seq_{(S)}$ obtained by applying the IFFT to the preamble $D\_seq_{(L)}$ or $D\_seq_{(S)}$ in the frequency domain in the foregoing embodiment may be used as a preamble in the time domain.

Note that the preamble generating device 1 in the present invention is not limited to executing a process of judging whether or not the PAPR matches a predetermined criteria every time a preamble is generated, and may also be configured to conduct the judgment process after generating a plurality of preambles. For example, in the case in which the first calculator 11 generates the first computational data by cyclically shifting the data sequence, a plurality of potential preambles may be generated by repeating the processing of the first calculator 11, the second calculator 12, and the preamble generator 13 until the cyclic shift completes a full cycle. After that, the preamble determiner 14 may determine on the preamble with the minimum PAPR from among the generated a plurality of potential preambles as the preamble that matches the predetermined criterion.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A preamble generating device that generates a preamble of a transmit signal, comprising:
    a model determiner that determines on a preamble model including a plurality of elements with a value of 0 or 1, according to a preamble requested for generation;
    a first calculator that generates first computational data by reordering elements in at least one of either a real data sequence that is a real part of a data sequence having a number of elements determined according to a number of elements in the preamble model, or an imaginary data sequence that is an imaginary part of the data sequence;
    a second calculator that generates second computational data in which elements of data obtained by applying a fast Fourier transform to the first computational data are spaced apart by a designated number of elements, the second computational data having a same number of elements as the number of elements in the preamble model;
    a preamble generator that generates a preamble by multiplying each element of the second computational data by an element of the preamble model at a same position as the each element; and
    a preamble determiner that determines on the preamble as a preamble of the transmit signal in a case in which a peak-to-average power ratio of data obtained by applying an inverse fast Fourier transform to the preamble matches a predetermined criterion.

2. The preamble generating device according to claim 1, further comprising:
    a process repeater that changes an order of elements in at least one of either the real data sequence or the imaginary data sequence when generating the first computational data, and repeats processing of the first calculator, the second calculator, and the preamble generator;
    wherein the preamble determiner determines on a preamble of the transmit signal from among a plurality of preambles generated by the repeated processing of the process repeater.

3. The preamble generating device according to claim 2, wherein
    the process repeater executes the repeated processing in a case in which the peak-to-average power ratio of data obtained by applying the inverse fast Fourier transform to the preamble generated by the preamble generator does not match the predetermined criterion.

4. The preamble generating device according to claim 1, wherein
    in a case in which the preamble requested for generation is a long preamble, the model determiner determines, as the preamble model, a long preamble model comprising an alternating arrangement of an element with a value of 1 and an element with a value of 0 as subcarriers used for data communication,
    the first calculator generates the first computational data by reordering elements in at least one of either a real data sequence that is a real part of a data sequence having one-half a number of elements of the long preamble model, or an imaginary data sequence that is an imaginary part of the data sequence, and
    the second calculator generates, as the second computational data, data in which elements of data obtained by applying a fast Fourier transform to the first computational data are spaced one element apart.

5. The preamble generating device according to claim 1, wherein
    in a case in which the preamble requested for generation is a short preamble, the model determiner determines, as the preamble model, a short preamble model comprising an alternating arrangement of one element with a value of 1 and three elements with a value of 0 as subcarriers used for data communication,
    the first calculator generates the first computational data by reordering elements in at least one of either a real data sequence that is a real part of a data sequence having one-fourth a number of elements of the short preamble model, or an imaginary data sequence that is an imaginary part of the data sequence, and the second calculator generates, as the second computational data, data in which elements of data obtained by applying a fast Fourier transform to the first computational data are spaced three elements apart.

6. The preamble generating device according to claim 1, wherein
the first calculator generates the first computational data by cyclically shifting each element of at least one of either the real data sequence or the imaginary data sequence a predetermined number of times in a predetermined direction.

7. The preamble generating device according to claim 1, wherein
the preamble determiner determines on the preamble as a preamble of the transmit signal in a case in which the peak-to-average power ratio and autocorrelation of data obtained by applying an inverse fast Fourier transform to the preamble match predetermined criteria.

8. The preamble generating device according to claim 1, wherein
the first calculator generates the first computational data using a sequence having a plurality of elements with equal absolute values as the data sequence.

9. A preamble generating method that generates a preamble of a transmit signal, comprising:
a model determining step that determines on a preamble model including a plurality of elements with a value of 0 or 1, according to a preamble requested for generation;
a first calculating step that generates first computational data by reordering elements in at least one of either a real data sequence that is a real part of a data sequence having a number of elements determined according to a number of elements in the preamble model, or an imaginary data sequence that is an imaginary part of the data sequence;
a second calculating step that generates second computational data in which elements of data obtained by applying a fast Fourier transform to the first computational data are spaced apart by a designated number of elements, the second computational data having a same number of elements as the number of elements in the preamble model;
a preamble generating step that generates a preamble by multiplying each element of the second computational data by an element of the preamble model at a same position as the each element; and
a preamble determining step that determines on the preamble as a preamble of the transmit signal in a case in which a peak-to-average power ratio of data obtained by applying an inverse fast Fourier transform to the preamble matches a predetermined criterion.

10. The preamble generating method according to claim 9, further comprising:
a repeating step that changes an order of elements in at least one of either the real data sequence or the imaginary data sequence when generating the first computational data, and repeats processing of the first calculating step, the second calculating step, and the preamble generating step;
wherein the preamble determining step determines on a preamble of the transmit signal from among a plurality of preambles generated by the repeated processing of the repeating step.

11. The preamble generating method according to claim 10, wherein
the repeating step executes the repeated processing in a case in which the peak-to-average power ratio of data obtained by applying the inverse fast Fourier transform to the preamble generated by the preamble generating step does not match the predetermined criterion.

12. The preamble generating method according to claim 9, wherein
in a case in which the preamble requested for generation is a long preamble, the model determining step determines, as the preamble model, a long preamble model comprising an alternating arrangement of an element with a value of 1 and an element with a value of 0 as subcarriers used for data communication,
the first calculating step generates the first computational data by reordering elements in at least one of either a real data sequence that is a real part of a data sequence having one-half a number of elements of the long preamble model, or an imaginary data sequence that is an imaginary part of the data sequence, and
the second calculating step generates, as the second computational data, data in which elements of data obtained by applying a fast Fourier transform to the first computational data are spaced one element apart.

13. The preamble generating method according to claim 9, wherein
in a case in which the preamble requested for generation is a short preamble, the model determining step determines, as the preamble model, a short preamble model comprising an alternating arrangement of one element with a value of 1 and three elements with a value of 0 as subcarriers used for data communication,
the first calculating step generates the first computational data by reordering elements in at least one of either a real data sequence that is a real part of a data sequence having one-fourth a number of elements of the short preamble model, or an imaginary data sequence that is an imaginary part of the data sequence, and
the second calculating step generates, as the second computational data, data in which elements of data obtained by applying a fast Fourier transform to the first computational data are spaced three elements apart.

14. The preamble generating method according to claim 9, wherein
the first calculating step generates the first computational data by cyclically shifting each element of at least one of either the real data sequence or the imaginary data sequence a predetermined number of times in a predetermined direction.

15. The preamble generating method according to claim 9, wherein
the preamble determining step determines on the preamble as a preamble of the transmit signal in a case in which the peak-to-average power ratio and autocorrelation of data obtained by applying an inverse fast Fourier transform to the preamble match predetermined criteria.

16. The preamble generating method according to claim 9, wherein
the first calculating step generates the first computational data using a sequence having a plurality of elements with equal absolute values as the data sequence.

17. A non-transitory computer-readable recording medium storing a program causing a computer that controls a preamble generating device that generates a preamble of a transmit signal to execute:
a model determining step that determines on a preamble model including a plurality of elements with a value of 0 or 1, according to a preamble requested for generation;
a first calculating step that generates first computational data by reordering elements in at least one of either a real data sequence that is a real part of a data sequence having a number of elements determined according to a number of elements in the preamble model, or an imaginary data sequence that is an imaginary part of the data sequence;

a second calculating step that generates second computational data in which elements of data obtained by applying a fast Fourier transform to the first computational data are spaced apart by a designated number of elements, the second computational data having a same number of elements as the number of elements in the preamble model;

a preamble generating step that generates a preamble by multiplying each element of the second computational data by an element of the preamble model at a same position as the each element; and a preamble determining step that determines on the preamble as a preamble of the transmit signal in a case in which a peak-to-average power ratio of data obtained by applying an inverse fast Fourier transform to the preamble matches a predetermined criterion.

* * * * *